US012139297B2

(12) United States Patent
Castelberg et al.

(10) Patent No.: US 12,139,297 B2
(45) Date of Patent: Nov. 12, 2024

(54) COATING COMPOSITION FOR PACKAGING ARTICLES

(71) Applicant: SWIMC LLC, Cleveland, OH (US)

(72) Inventors: Urban Castelberg, Weisslingen (CH); Kurt Hans Ashwanden, Jona (CH)

(73) Assignee: SWIMC LLC, Cleveland, OH (US)

( * ) Notice: Subject to any disclaimer, the term of this patent is extended or adjusted under 35 U.S.C. 154(b) by 2312 days.

(21) Appl. No.: 14/267,479

(22) Filed: May 1, 2014

(65) Prior Publication Data
US 2014/0319133 A1 Oct. 30, 2014

Related U.S. Application Data

(63) Continuation of application No. PCT/US2012/063371, filed on Nov. 2, 2012.

(60) Provisional application No. 61/556,017, filed on Nov. 4, 2011.

(51) Int. Cl.
B65D 1/40 (2006.01)
B65D 25/14 (2006.01)
B65D 25/34 (2006.01)
B65D 83/38 (2006.01)
C08G 63/685 (2006.01)
C09D 167/00 (2006.01)

(52) U.S. Cl.
CPC .............. B65D 1/40 (2013.01); B65D 25/14 (2013.01); B65D 25/34 (2013.01); B65D 83/38 (2013.01); C08G 63/6854 (2013.01); C09D 167/00 (2013.01); B05D 2202/25 (2013.01)

(58) Field of Classification Search
CPC ...... B65D 25/14; B65D 1/40; C08G 63/6854; C09D 167/00; C09D 167/02; C09D 167/025; C09D 167/03; C09D 167/04; C09D 167/06; C09D 167/07; C09D 167/08
See application file for complete search history.

(56) References Cited

U.S. PATENT DOCUMENTS

| 3,249,578 | A | 5/1966 | Meyer et al. |
| 4,066,593 | A | 1/1978 | Czajka et al. |
| 4,116,941 | A | 9/1978 | Hanson |
| 4,206,098 | A | 6/1980 | Sattler et al. |
| 4,273,917 | A | 6/1981 | Zamek |
| 4,278,206 | A | 7/1981 | Prussin |
| 4,362,861 | A | 12/1982 | Shen |
| 4,446,300 | A | 5/1984 | Mabrey et al. |
| 4,476,279 | A | 10/1984 | McGregor et al. |
| 4,953,621 | A | 9/1990 | Putzig et al. |
| 4,966,932 | A | 10/1990 | McGregor et al. |
| 4,997,891 | A | 3/1991 | Cicero et al. |
| 5,069,368 | A | 12/1991 | Godard et al. |
| 5,260,138 | A * | 11/1993 | Hohlein ............... C08G 18/807 525/437 |
| 5,572,893 | A | 11/1996 | Goda et al. |
| 5,750,223 | A | 5/1998 | Tada et al. |
| 6,046,326 | A | 4/2000 | Lavallée |
| 6,908,692 | B1 | 6/2005 | Bohm et al. |
| 2005/0249879 | A1 | 11/2005 | Jenkins et al. |
| 2005/0249897 | A1 | 11/2005 | Jenkins et al. |
| 2006/0034778 | A1 | 2/2006 | Kitano et al. |
| 2006/0057491 | A1 | 3/2006 | Wayton et al. |
| 2006/0093768 | A1 | 5/2006 | Parekh et al. |
| 2007/0031672 | A1 | 2/2007 | Boehm et al. |
| 2007/0272768 | A1 * | 11/2007 | Williams ............... B65D 83/38 239/373 |
| 2010/0221442 | A1 * | 9/2010 | Adachi ................. C08G 18/348 427/407.1 |
| 2010/0255328 | A1 * | 10/2010 | Tomizaki ............... B05D 7/542 428/483 |
| 2010/0260954 | A1 * | 10/2010 | Stenson ............... C08G 18/423 428/35.8 |
| 2011/0195263 | A1 * | 8/2011 | Malotky ................ C08J 3/05 428/480 |
| 2011/0284587 | A1 | 11/2011 | Galazka et al. |
| 2015/0344732 | A1 | 12/2015 | Witt-Samson et al. |

FOREIGN PATENT DOCUMENTS

| EP | 3192842 | 7/2017 |
| EP | 2 935 487 B1 | 6/2019 |
| EP | 3 093 320 B1 | 7/2021 |
| GB | 1226147 | 3/1971 |
| JP | H05339540 | 12/1993 |
| JP | H11-116895 | 4/1999 |
| JP | H11116895 A | 4/1999 |

(Continued)

OTHER PUBLICATIONS

Sapilub, Ltd Introduction of Sapilub, Ltd, Jun. 13, 2007 (7 pages).
Sapilub Aluliquid 13 Information sheet, Oct. 31, 2003, German language (2 pages).
Henkel P3 Almeco A 62 L, Sicherheitsdatenblätter Nr. 352193, VOO1.2, Print date: Feb. 28, 2011, German Language (8 pages).
Henkel Novadip 4124 Product Information Sheet, Sicherheitsdatenblätter Nr. 293819, VOO2.0, Print date: Feb. 15, 2011, German Language (5 pages).
Henkel Novaclean 208 Product Bulletin, published Oct. 8, 2009 (3 pages).
Henkel Novaclean 208 Information Sheet, Sicherheitsdatenblätter Nr. 34998, VOO1.1, Print date: Feb. 28, 2011, German-language (6 pages).

(Continued)

Primary Examiner — Zachary M Davis
(74) Attorney, Agent, or Firm — Dickinson Wright PLLC

(57) ABSTRACT

A coating composition is provided that includes a polymer, which is preferably a polyester polymer. The polyester polymer preferably includes one or more heterocyclic groups that preferably include at least one nitrogen atom and at least one carbonyl group. In one embodiment, the binder polymer is made using ingredients including tris(2-hydroxyethyl) isocyanurate. The coating composition is useful in a variety of packaging coating applications, including as a coating for aluminum monobloc containers.

19 Claims, No Drawings

(56) References Cited

FOREIGN PATENT DOCUMENTS

| JP | 2000-129207 | 5/2000 |
|---|---|---|
| JP | 2000129207 A | 5/2000 |
| KR | 20020006440 A | 1/2002 |
| WO | 2010062928 A1 | 6/2010 |

OTHER PUBLICATIONS

BASF Tris-2-hydroxyethyl Technical Data Sheet, Feb. 1997 (1 page).
Dupont Vitatex THEIC-Polyesterimide Product Information, website Extract, published 2011 (2 pages).
Dupont Tyzor Product information, website extract (2 pages).
Dorf Ketal website extract of Tyzor TnBT Organic Titanate (2 pages).
Sapilub Aluliquid 25 product information and technical data, Oct. 31, 2003 and Jan. 17, 2007 (7 pages).
Sapilub Lubrimet GTT-X Product and Technical information, Nov. 22, 2004 (2 pages).
Henkel Novadip 4124 Product Bulletin Published Jul. 17, 2007 (2 pages).
EP Patent No. 2773710 (Application No. 12845742.1), Notice of Opposition filed Jan. 6, 2017 (30 pages).
International Search Report for International Application PCT/US2012/063371, mail date Mar. 4, 2013. (5 pages).
International Preliminary Report on Patentability for International Application PCT/US2012/063371, mail date May 6, 2014. (7 pages).
Reply Brief (including Auxiliary Requests) dated Jun. 23, 2017, filed by the Patent Owner in response to the Notice of Opposition of EP Patent No. 2773710, EP Application No. 12845742.1 (61 pages).
"HP DME Aerosol Propellant" available online at: https://www.chemours.com/Propellants/en_US/assets/downloads/hp-dme-technical-information.pdf (4 pages).
Terry A. Turner: "Canmaking: The Technology of Metal Production and Decoration", 1998 (3 pages).
W. A. Poucher: "Poucher's Perfumes, Cosmetics and Soaps: vol. 3: Cosmetics"; 1993.
Summons to Oral Proceedings, dated Nov. 18, 2017, EP12845742.1.
Toyo Seikan Co., Ltd., Techical Information, printed Apr. 27, 2018, https://web.archive.org/web/20140830085237/https://www.toyo-seikan.co.jp/e/techni . . . .
Tetraethylammonium Chloride, pp. 1318, (2016).
Notice of Opposition of EP2773710, dated Jan. 6, 2017.
Written Submission of Valapar Sourcing, Inc., (Opposition of EP2773710), dated Apr. 27, 2018.
Aluminum: The Light Weight Champion, There are lots of reasons why aluminum aerosol containers 'knock out' their competition. CLL Container, http://cclcontainer.com/aluminum-the-light-weight-champion/, (Aug. 21, 2013).
N-Methyl-2-Pyrrolidon in Polyamid-imid based internal lacquers for aluminum aerosol cans, (2011), International Organisation of Aluminum Aerosol Container Manufacturers.
Written Submissions of PPG Industries, Opposition of EP2773710), Apr. 26, 2018.
Tyzor TPT, Technical Data Sheet, https://adhesives.specialchem.com/product/a-dorf-ketal-tyzor-tpt (2018).
Lubrizol, Technical Data Sheet Jun. 4, 2007.
Dupont Tyzor Organic Titanates General Brochure, (2001).
Appeal Brief for EP 12845742.1, filed Jan. 2, 2019.
Minutes of Oral Proceeding for 12845742.1, dated Aug. 23, 2018.
Decision Revoking EP Patent for EP2771710, dated Aug. 23, 2018.
Scientific American, The Aluminum Beverage Can, Dated Sep. 1994; 6 pages.
Letter in response to Opponent dated Oct. 16, 2019 in response to the Notice of Opposition of EP Patent No. 2773710, EP Application No. 12845742.1 (19 pages).
Letter in response to Patentee dated Dec. 19, 2019 in response to the Notice of Opposition of EP Patent No. 2773710, EP Application No. 12845742.1 (2 pages).
Letter in response to Grounds of Appeal dated Dec. 1, 2020 in response to the Notice of Opposition of EP Patent No. 2773710, EP Application No. 12845742.1 (3 pages).
BYK Brochure Can Coatings, 2 pages (Jul. 2011).
BYK-4510 Data Sheet, 2 pages (Jul. 2012).
Certified priority document (U.S. Appl. No. 61/556,017), 42 pages (filed Nov. 11, 2012).
Notice of Opposition to EP Patent No. 3093320, Application No. 16163127.0 mailed Apr. 28, 2022.
Reply to the Communication Pursuant to Art. 94(3) EPC dated May 14, 2019 for Application No. 16163127.0, 3 pages mailed Nov. 25, 2019.

\* cited by examiner

COATING COMPOSITION FOR PACKAGING ARTICLES

CROSS-REFERENCE TO RELATED APPLICATION

This application is a continuation of International Application No. PCT/US2012/063371 filed Nov. 2, 2012, and entitled "COATING COMPOSITION FOR PACKAGING ARTICLES," which claims the benefit of U.S. Provisional Application Ser. No. 61/556,017 filed on Nov. 4, 2011, and entitled "COATING COMPOSITION FOR PACKAGING ARTICLES," each of which is incorporated herein by reference in its entirety.

BACKGROUND

A wide variety of coatings have been used to coat the surfaces of metal packaging containers. Such metal containers are available in a variety of different configurations in order to accommodate the multitude of different packaging end uses and packaged products. The inner surface of such metal containers is typically coated with one or more coatings to avoid unsuitable interactions between the metal substrate and ingredients of the packaged product, which can result in corrosion of the metal substrate and/or adulteration of the packaged product.

Metal aerosol containers are but one example of a metal packaging container. Metal aerosol containers are used to store and dispense a variety of packaged products including, for example, automotive products, cleaning products, cosmetics, food products, and pharmaceutical products. Aerosol containers are typically pressurized and include a valve to dispense the packaged product. The container is typically packaged with both an object material (e.g., the packaged product) and a propellant, which may be contained together or in separate compartments. One or both of the object material or the propellant may include ingredients that are corrosive, and in some cases strongly corrosive, to polymer coatings applied to the inner surface of the container. For example, hair dyes and propellants including dimethyl ether are known to be particularly aggressive towards polymer coatings.

Aluminum monobloc containers are a common type of metal aerosol containers. Such monobloc containers are typically formed from an aluminum slug using an impact extrusion process, which is often followed by one or more necking steps.

Various coatings have been used as interior protective can coatings, including polyvinyl-chloride-based coatings and epoxy-based coatings incorporating bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate epoxy coatings.

What is needed in the marketplace is an improved packaging coating such as, for example, an improved packaging coating for aerosol container applications.

SUMMARY

In formulating a polymer coating for use in packaging coating applications, the challenge for the coating designer is to balance a variety of coating characteristics such as, for example, good coating application and cure properties (i.e., free from unsuitable blistering, etc.), chemical resistance, adhesion to the underlying substrate, low migration of components of the coating into the packaged product, low adsorption of materials onto the coating, suitable compatibility with the ingredients of packaged products, stability, and cost.

In one aspect, the present disclosure provides a coating composition suitable for use in metal packaging coating applications. In certain preferred embodiments, the coating composition is particularly suitable for use on the surfaces of aluminum monobloc containers and/or metal aerosol containers. The coating composition preferably includes a binder polymer, more preferably a polyester binder polymer, which includes one or more heterocyclic organic groups. Nitrogen-containing heterocyclic groups that include one or more carbonyl groups are presently preferred. In a preferred embodiment, the one or more nitrogen-containing heterocyclic groups include a six-member ring that includes three nitrogen atoms and three carbon atoms of carbonyl groups.

In preferred embodiments, the coating composition is a thermoset coating composition and further includes an optional liquid carrier, an optional catalyst, and any other desired optional ingredients. A titanium-containing catalyst is presently preferred, although any suitable catalyst or combinations of catalysts may be used, if desired.

In certain preferred embodiments, the one or more nitrogen-containing heterocyclic groups of the polymer are present in one or more segments of the below Formula (I).

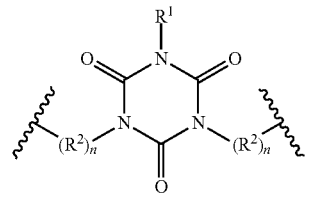

Formula (I)

wherein:
  each n is independently 0 or 1;
  $R^1$ is any suitable atom or group, more preferably $R^1$ is an organic group (e.g., a monovalent organic group such as an aryl group, an aliphatic group, an alicyclic group, or a combination thereof);
  each $R^2$ is independently, if present, a monovalent organic group or an at least divalent organic group (more typically a divalent organic group) that links the segment of Formula (I) to another portion of the polymer, with the proviso that no more than one $R^2$ is a monovalent organic group; and
  one or more $R^1$ and/or $R^2$ groups can optionally join to form one or more cyclic groups.

The polymer may include any suitable number of the one or more segments of Formula (I) at any desired location. In some embodiments, the polymer may include at least one segment of Formula (I) located at a terminal end of a backbone of the polymer, in which case one of the $R^2$ groups is a monovalent group.

Formula (IB) below depicts a segment of Formula (I) in which one $R^2$ group is a monovalent group.

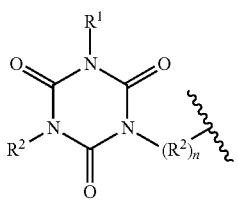

Formula (IB)

In some embodiments, the nitrogen-containing heterocyclic groups and/or the segments of Formula (I) are derived from tris(2-hydroxyethyl) isocyanurate or a derivative or variant thereof.

In another aspect, the present disclosure provides a metal packaging container, or a portion thereof, having a coating composition of the present disclosure applied on at least a portion of an exterior or an interior surface thereof. In one embodiment, the packaging container is a pressurized metal container (e.g., an aerosol container) having a coating composition of the present disclosure disposed on at least a portion of an interior surface thereof. An aluminum monobloc container for use in pressurized applications is one example of such a pressurized container. Preferred coating compositions of the present disclosure, when cured on a suitably clean interior surface of such a metal container, exhibit excellent corrosion resistance to propellants, including dimethyl ether, which is known to be a particularly aggressive propellant.

In another aspect, the present disclosure provides a method of coating a metal substrate with a coating composition described herein prior to or after forming the metal substrate into a packaging container or a portion thereof. In one such embodiment, a coating composition of the present disclosure is spray applied to an interior surface of an aerosol container or an aluminum monobloc container (which may be an aluminum monobloc aerosol container) and then thermally cured to form an adherent coating having an excellent balance of coating properties.

In yet another aspect, the present disclosure provides a method of using an article, which includes providing a metal container having an adherent coating described herein applied on at least a portion of an interior surface of the container and filling the container with a product such as, for example, a food or beverage product, a cosmetic product, a pharmaceutical or healthcare product, etc. In some embodiments, the container is filled with a product that also includes a propellant for purposes of dispensing the product from the container (e.g., through a valve).

The above summary is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and from the claims.

Selected Definitions

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

A group that may be the same or different is referred to as being "independently" something. Substitution is anticipated on the organic groups of the compounds of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "substantially free" of a particular mobile compound means that the compositions of the present disclosure contain less than 100 parts per million (ppm) of the recited mobile compound. The term "essentially free" of a particular mobile compound means that the compositions of the present disclosure contain less than 5 parts per million (ppm) of the recited mobile compound. The term "completely free" of a particular mobile compound means that the compositions of the present disclosure contain less than 20 parts per billion (ppb) of the recited mobile compound.

The term "mobile" means that the compound can be extracted from the cured coating when a coating (typically, approximate film weight of 1 milligram per square centimeter ($mg/cm^2$)) is exposed to a test medium for some defined set of conditions, depending on the end use. An example of these testing conditions is exposure of the cured coating to 10 weight percent ethanol solution for two hours at 121° C. followed by exposure for 10 days in the solution at 49° C.

If the aforementioned phrases are used without the term "mobile" (e.g., "substantially free of XYZ compound") then the compositions of the present disclosure contain less than the aforementioned amount of the compound whether the compound is mobile in the coating or bound to a constituent of the coating.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., polyester-imide copolymers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the present disclosure provides a coating composition having utility in packaging coatings applications as either an external or internal coating. In preferred embodiments, the coating composition is suitable for use as an internal coating on a metal packaging container. Examples of such packaging containers include pressurized or non-pressurized metal cans for use in packaging products such as, for example, automotive products, cleaning products, cosmetics, food products, and pharmaceutical products. In preferred embodiments, the coating composition of the present disclosure is compliant with the U.S. Food and Drug Administration's (FDA) guidelines for food-contact coatings and/or the European Food Safety Authority (EFSA) guidelines for food packaging.

The coating composition includes a binder polymer, which is preferably included in at least a film-forming amount. In addition to the polymer, the coating composition may also include one or more additional ingredients such as, for example, a liquid carrier, a catalyst (e.g., a cure catalyst), a lubricant, a crosslinker, a wetting additive, or any other suitable optional additives. Although any suitable cure mechanism may be used, thermoset coating compositions are preferred. Moreover, although coating compositions including a liquid carrier are presently preferred, it is contemplated that the polymer of the present disclosure may have utility in solid coating application techniques such as, for example, powder coatings for packaging coating end uses.

In preferred embodiments, the binder polymer is a polyester polymer having a polyester backbone that may optionally include one or more step-growth linkages (e.g., condensation linkages) other than ester linkages such as, for example, amide linkages, carbonate linkages, ester linkages, imide linkages, urea linkages, urethane linkages, etc. In some embodiments, the binder polymer is a polyester polymer in which at least 50% of the step-growth linkages of the binder polymer are ester linkages, more preferably at least 75% or 90%, and in some embodiments 100%. Thus, in one embodiment, the binder polymer is a polyester polymer that does not include any step-growth and/or condensations linkages other than ester linkages.

In some embodiments, the binder polymer may be a polyester-imide polymer. In other embodiments, the binder polymer is a polyester polymer that does not include any imide linkages.

In preferred embodiments, the binder polymer includes two or more reactive functional groups, which are typically active hydrogen groups. The reactive functional groups are preferably located at one or both terminal ends of a backbone of the polymer and/or in locations pendant to the backbone. Hydroxyl groups are presently preferred reactive functional groups. In a presently preferred embodiment, a backbone of the polymer is hydroxyl-terminated and the polymer preferably further includes one or more pendant hydroxyl groups.

For sake of convenience, in the discussion that follows, the binder polymer of the present disclosure is discussed in terms of being a polyester polymer. As previously discussed, however, it is contemplated that the binder polymer of the present disclosure may have a structural configuration other than that of a polyester polymer. It should be understood that the below discussion will be generally applicable to binder polymers of the present disclosure that are not polyester polymers.

The polyester polymer of the present disclosure can have any suitable hydroxyl number to achieve a desired result. Hydroxyl numbers are typically expressed as milligrams of potassium hydroxide (KOH) equivalent to the hydroxyl content of 1 gram of the hydroxyl-containing substance.

Methods for determining hydroxyl numbers are well known in the art. See, for example, ASTM D1957-86 (Reapproved 2001) entitled "Standard Test Method for Hydroxyl Value of Fatty Oils and Acids" and available from the American Society for Testing and Materials International of West Conshohocken, Pennsylvania. In some embodiments, the polyester polymer has a hydroxyl number of at least about 100, more preferably at least about 150, and even more preferably at least about 200. The upper hydroxyl number is not especially limited, but due to practical considerations, will typically be less than about 600, 500, 400, or 300.

The polyester polymer may have any suitable acid number. Acid numbers are typically expressed as milligrams of KOH required to titrate a 1-gram sample to a specified end point. Methods for determining acid numbers are well known in the art. See, for example, ASTM D974-04 entitled "Standard Test Method for Acid and Base Number by Color-Indicator Titration" and available from the American Society for Testing and Materials International of West Conshohocken, Pennsylvania. The range of suitable acid numbers may vary depending on a variety of considerations including, for example, whether water-dispersibility is desired. In certain embodiments (e.g., where a solvent-based coating composition is desired), the polyester polymer has an acid number of preferably less than about 40, more preferably less than about 10, and even more preferably less than about 5.

In preferred embodiments, the polyester polymer of the present disclosure includes one or more organic cyclic groups, which in preferred embodiments are heterocyclic groups. While not wishing to be bound by any theory, it is believed that certain heterocyclic groups such as nitrogen-containing cyclic organic groups that preferably include carbonyl groups can contribute to increased resistance of the coating to certain aggressive compounds such as, for example, dimethyl ether (commonly used as a propellant and/or solvent for hair spray products).

Nitrogen-containing cyclic organic groups are preferred heterocyclic groups, with six-member nitrogen-containing rings that also include one or more carbon atoms of one or more carbonyl groups (i.e., —C(O)—) being particularly preferred. Such six-member rings may contain any suitable number of one or more nitrogen atoms such as, for example, one, two, or three nitrogen atoms, with three nitrogen atoms being preferred in certain embodiments. In presently preferred embodiments, the polyester polymer includes at least one, and more preferably a plurality of heterocyclic groups that include alternating carbon atoms (more preferably carbon atoms of carbonyl groups) and nitrogen atoms in the ring, with six-member heterocyclic rings that include alternating carbon atoms of carbonyl groups and nitrogen atoms being particularly preferred.

In some embodiments, the heterocyclic groups are monocyclic groups.

In a preferred embodiment, the polyester polymer includes one or more of the following segments of Formula (I):

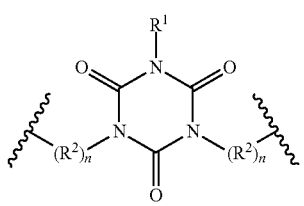

Formula (I)

wherein:
each n is independently 0 or 1;
$R^1$ is any suitable atom or group, more preferably $R^1$ is an organic group (e.g., a monovalent organic group such as an aryl group, an aliphatic group, an alicyclic group, or a combination thereof);
each $R^2$ is independently, if present, a monovalent organic group or an at least divalent organic group (more typically a divalent organic group) that links the segment of Formula (I) to another portion of the polymer, with the proviso that no more than one $R^2$ is a monovalent organic group; and
one or more $R^1$ and/or $R^2$ groups can optionally join to form one or more cyclic groups.

In preferred embodiments, a backbone of the polyester polymer includes one or more, and more preferably a plurality, of segments of Formula (I). The segments of Formula (I) can be located at any suitable location in the polymer, including, for example, on one or both terminal ends of a backbone of the polymer, in one or more intermediate locations within the backbone, and/or in one or more pendant groups.

Formula (IB) below depicts a segment of Formula (I) in which one $R^2$ group is a monovalent group.

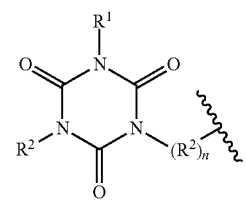

Formula (IB)

The segment of Formula (I) can be of any suitable size. Typically, however, the segment of Formula (I) will have an atomic weight of less than about 1,000 Daltons, more typically less than 500 Daltons, more typically less than about 300 Daltons. In some embodiments, the segment of Formula I has an atomic weight of from about 200 to about 400 Daltons.

$R^1$ can be of any suitable size. Typically, however, $R^1$ is a monovalent organic group having an atomic weight of less than about 200 Daltons, less than about 100 Daltons, or less than about 50 Daltons. In certain preferred embodiments, $R^1$ includes a reactive functional group, more preferably a hydroxyl group. In a particularly preferred embodiment, $R^1$ is a saturated or unsaturated alkyl group (e.g., C1-C6) that includes a hydroxyl group, with the structure —$CH_2CH_2$—OH being preferred.

Similarly, each $R^2$ can be of any suitable size. Typically, however, $R^2$ will have an atomic weight of less than about 200, 150, or 100 Daltons.

In some embodiments, each n is 1 and one or both $R^2$ groups are terminated with an oxygen atom, which is preferably part of an ester linkage. Each $R^2$ linkage group preferably includes a terminal oxygen atom positioned away from the heterocyclic ring such that the oxygen atom is part of an ester linkage or other step-growth linkage that covalently attaches the segment of Formula (I) to another portion of the polymer, which is typically another backbone segment of the polymer. In some such embodiments, each $R^2$ is of the formula —O—$(CR^3R^4)_t$—, wherein t is 0 to 10, more preferably 1 to 4, and in some embodiments 2; and each of $R^3$ and $R^4$ independently denote one of a hydrogen atom, a halogen atom, or an organic group (e.g., a monovalent organic group such as, e.g., a monovalent aliphatic, alicyclic, or aryl group). In an embodiment, each of $R^3$ and $R^4$ are hydrogen atoms and t is two.

In preferred embodiments, the segment of Formula (I) is attached on at least one end via a step-growth linkage, which is preferably an ester linkage, to another portion of the polymer. As previously discussed, in some embodiments, it is contemplated that the segment of Formula (I) may be positioned at a terminal end of the polymer backbone, such that one of the $R^2$ groups is a terminal monovalent group (as opposed to the depicted at least divalent group). In certain preferred embodiments, the polymer includes one or more segments of Formula (I) that are attached on each end via a step growth linkage, more preferably an ester linkage, to another portion of the polymer. While ester linkages are presently preferred, it is contemplated that any suitable step-growth linkages may be used to attach the segment of Formula (I) to one or more other portions of the polymer such as, for example, amide linkages, carbonate linkages, ester linkages, imide linkages, urea linkages, urethane linkages, etc.

In some embodiments, the segment of Formula (I) is a monocyclic group.

As depicted below in Formula (II), in certain preferred embodiments, the polyester polymer includes one or more segments of Formula (I), where each n is 1, $R^1$ is —$CH_2CH_2$—OH, and $R^2$ is of the formula —O—$(CR^3R^4)_t$, wherein t is 2 and $R^3$ and $R^4$ are each hydrogen. Such a segment of Formula (II) may be derived from tris(2-hydroxyethyl) isocyanurate ("THEIC").

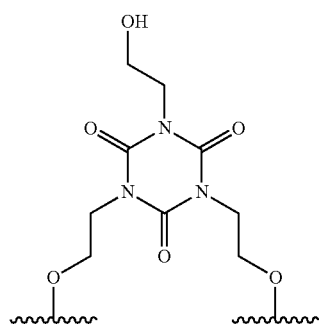

Formula (II)

In preferred embodiments, one or both ends of the segment of Formula (II) are attached to another portion of the polymer via an ester linkage that includes the depicted oxygen atom. The segment of Formula (II) may also be located at a terminal end, in which case one of the depicted oxygen atoms is typically attached to a hydrogen atom such that the segment of Formula (II) includes two hydroxyl groups.

The polyester polymer may include any suitable amount of one or more segments of Formula (I). In certain preferred embodiments, the segments of Formula (I) constitute at least about 5 weight percent (wt-%), more preferably at least about 10 wt-%, and even more preferably at least about 20 wt-% of the polymer. While the upper end amount is not particularly limited, the polyester polymer will typically include less than 75 wt-%, less than 60 wt-%, or less than 50 wt-% of the segments of Formula (I). In a presently preferred embodiment, the polyester polymer of the present disclosure includes an amount of segments of Formula (I) derived from THEIC falling within the aforementioned concentration ranges.

The molecular weight of the polyester polymer of the present disclosure can vary depending upon material choice and the desired end use. In preferred embodiments, the polymer has a number average molecular weight (Mn) of at least about 500, more preferably at least about 750, and in some embodiments about 1,000 or higher. In some embodiments, (e.g., embodiments in which the polymer is made from ingredients including a substantial amount of THEIC monomer or another tri-functional monomer of the like) the molecular weight of the polyester polymer is controlled so that the polymer does not gel.

The polyester polymer of the present disclosure can be made from any suitable ingredients using any suitable process. For example, the polyester polymer of the present disclosure can be made by polymerizing ingredients including a polyacid (more typically a diacid); an optional polyol (more typically a diol); and an at least monofunctional compound, more preferably an at least difunctional compound, that includes a heterocyclic group having both one or more nitrogen atoms in the ring and one or more carbonyl carbon atoms in the ring. In preferred embodiments, the heterocyclic-group-containing compound has at least two reactive functional groups capable of participating in a step-growth polymerization reaction, with active hydrogen groups being presently preferred. Carboxylic groups and hydroxyl groups are preferred such groups, with hydroxyl groups being particularly preferred.

In a presently preferred embodiment, the heterocyclic-group-containing compound is of the below Formula (III):

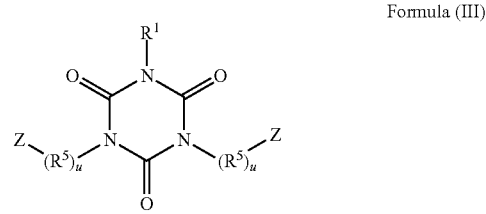

Formula (III)

wherein:
each $R^1$ is as described previously for Formula (I);
each $R^5$, if present, is an at least divalent organic group, more typically a divalent organic group;
u is 0 or 1;
one or more $R^1$ and/or $R^5$ groups can optionally join to form one or more cyclic groups; and
each Z is independently a reactive functional group, more preferably a reactive functional group capable of participating in a step-growth polymerization reaction (e.g., an active hydrogen group), even more preferably a hydroxyl group or a carboxylic group.

In some embodiments, at least one $R^1$ depicted in Formula (III) includes a reactive functional group, more preferably a hydroxyl group. In a presently preferred embodiment, each Z is a hydroxyl group and $R^1$ includes a hydroxyl group, more preferably a terminal hydroxyl group. THEIC is a preferred example of such a compound and is depicted below.

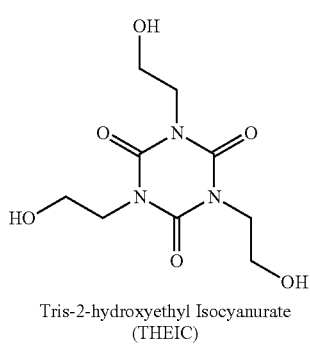 [SMILES: O=c1n(CCO)c(=O)n(CCO)c(=O)n1CCO]

Tris-2-hydroxyethyl Isocyanurate
(THEIC)

The polyester polymer of the present disclosure can be made using any suitable materials and processes known in the art. See, for example, U.S. Pat. Nos. 3,249,578, 4,066,593, 4,116,941, 4,362,861, 4,476,279, which each describe materials and processes for preparing THEIC-containing polyesters.

Non-limiting examples of suitable polycarboxylic acids for preparing the polymer include dicarboxylic acids and polycarboxylic acids having higher acid functionality (e.g., tricarboxylic acids, tetracarboxylic acids, etc.) or anhydrides thereof, precursors or derivatives thereof (e.g., an esterifiable derivative of a polycarboxylic acid, such as a dimethyl ester or anhydride), or mixtures thereof. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, isophthalic acid, trimellitic acid, terephthalic acid, naphthalene dicarboxylic acid, cyclohexane dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol. It should be understood that in synthesizing the polyester, the specified acids may be in the form of anhydrides, esters (e.g., alkyl ester) or like equivalent form. For sake of brevity, such compounds are referred to herein as "carboxylic acids."

Non-limiting examples of suitable polyols for use in forming the polymer include diols, polyols having three or more hydroxyl groups (e.g., triols, tetraols, etc.), and combinations thereof. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), and mixtures thereof. If desired, adducts of polyol compounds (e.g., triols, tetraols, etc.) and monofunctional compounds may be used. An example of one such adduct is dipentaerythritol pre-reacted with benzoic acid.

In some embodiments, the backbone of the polyester polymer is hydroxyl-terminated and/or carboxyl-terminated, more preferably hydroxyl-terminated. The polymer may be linear, substantially linear, or branched, if desired.

The coating composition of the present disclosure can include any suitable amount of polyester binder polymer, although as previously discussed, the coating composition preferably includes at least a film-forming amount of the binder polymer. In preferred embodiments, the coating composition includes from about 15 wt-% to about 100 wt-% of the polyester binder polymer, based on the total nonvolatile weight of the coating composition, more preferably at least about 25 wt-%, even more preferably at least about 50 wt-%, and even more preferably at least 80 wt-%. If desired, the coating composition may optionally include one or more co-resins in addition to the polyester binder polymer.

Coating compositions of the present disclosure preferably further include a catalyst, more preferably an organometallic catalyst. Preferred catalysts include titanium-containing catalysts, quaternary ammonium cation-containing catalysts, zirconium-containing catalysts, or combinations thereof. Non-limiting examples of such catalysts include chelates or complexes of titanium or zirconium with organic compounds. It is further contemplated that certain zinc-containing catalysts may be used either alone or in combination with another catalyst. In certain embodiments, a titanium-containing catalyst is preferred, which is more preferably an organometallic titanium-containing catalyst.

While not intending to be bound by any theory, it is believed that the inclusion of one or more suitable catalysts may provide one or more of the following benefits: (i) reduced cure time and/or cure temperature for the coating composition and/or (ii) enhanced crosslinking. While not intending to be bound by any theory, it is believed that a suitable catalyst such as, for example, a titanium-containing catalyst, can function as a crosslinker that reacts with hydroxyl groups of the binder polymer and forms covalent linkages that include the catalyst. (For further a further discussion of such catalyst crosslinking see, e.g., U.S. Pat. No. 4,953,612.) It is also believed that a suitable titanium-containing catalyst or quaternary ammonium cation-containing catalyst may also contribute to enhanced coating cure through catalysis of transesterification reactions. The inventors have observed that a coating composition of the present disclosure that includes both a THEIC-based polyester binder polymer and a suitable amount of a titanium-containing organometallic catalyst or quaternary ammonium cation-containing catalyst cured at a temperature of about 50° C. less than a similar coating composition lacking such a catalyst.

Suitable titanium-containing catalysts may include, for example, titanium acetylacetonate, tetraalkyltitanates (e.g., tetramethyl titanate, tetraethyl titanate, tetraisopropyl titanate, tetrabutyl titanate, diisopropyl dibutyl titanate, etc.), aryl titanates (e.g., tetraphenyltitanate, tetracresyltitanate, tetraxylenyl titanate, etc), isopropylorthotitanate, triethanolamine chelates of titanium, tetratriethanolamine chelates of titanium, any other suitable complexes or chelates of titanium, and combinations thereof.

Suitable commercially available titanium-containing catalysts may include, for example, those available under the trade names VERTEC IA10, PI2, TAA, TET, and XL900 (all from Johnson Matthey, Chicago, IL); and TYZOR 131, LA, TE, TnBT, and TPT (all from Du Pont de Nemours, Wilmington, DE).

Suitable zirconium-containing catalysts may include, for example, zirconium propionate, zirconium acetate, ammonium zirconyl carbonate, zirconate (2)-bis[carbonato(2)-O] dihydroxy-diammonium, zirconium chelated salts (such as tetrakis [[2,2',2''-nitrilotris(ethanolato)](1-)-N,O]zirconium), sodium zirconium lactate, sodium zirconium glycolate, and combinations thereof.

Suitable commercially available zirconium-containing catalysts may include, for example, those available under the trade names BACOTE 20 (MEL Chemicals, Manchester, UK); TYZOR 217 and 218, and TEAZ (all from Du Pont de Nemours, Wilmington, DE).

Suitable commercially available quaternary ammonium cation-containing catalysts may include, for example, benzyltributyl ammonium chloride, benzyltriethyl ammonium chloride, benzyltriethyl ammonium iodide, benzyltrimethyl ammonium chloride, cetyltrimethyl ammonium bromide, tetrabutylammonium chloride, tetrabutylammonium hydrogensulfate, tetrabutylammonium iodide, and tetradecyltrimethyl ammonium bromide. Such catalysts are commercially available, e.g., from Chemische Fabrik Berg GmbH of Bitterfeld, Germany.

In certain embodiments, the coating compositions, as disclosed within, may include one or more catalysts at a suitable level to produce the desired result. In certain embodiments, one or more catalysts are present in a total amount of preferably at least 0.1 wt-%, more preferably at least 0.5 wt-%, even more preferably at least 2 wt-%, and optimally at least 4 wt-%, based on the total non-volatile weight of the coating composition. In certain embodiments, one or more catalysts are present in a total amount of no greater than 10 wt-%, based on the total non-volatile weight of the coating composition. While not intending to be bound by theory, it is believed that beneficial coating properties can result from using an amount of suitable catalyst that is higher than a "catalytic" amount that would typically be used in such applications. In one embodiment, the coating composition includes from about 4 to 6 wt-% of one or more titanium-containing organometallic catalysts, based on the total nonvolatile weight of the coating composition.

The coating composition of the present disclosure may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, dyes, pigments, toners, extenders, fillers, lubricants, anticorrosion agents, flow control agents, thixotropic agents, dispersing agents, antioxidants, adhesion promoters, light stabilizers, wetting agents (e.g., silicone-based wetting agents), and mixtures thereof. Each optional ingredient is included in a sufficient amount to serve its intended purpose, but not in such an amount to adversely affect a coating composition or a cured coating resulting therefrom.

If desired, the coating composition may optionally include one or more crosslinkers such as, for example, an amino crosslinker, a phenolic crosslinker (e.g., a resole phenolic crosslinker), a blocked isocyanate crosslinker, or a combination thereof.

Another useful optional ingredient is a lubricant, like a wax, which can, e.g., facilitate manufacture of coated articles (e.g., food or beverage can ends) by imparting lubricity to a planar coated metal substrate. A lubricant is preferably present in the coating composition in an amount of 0 to about 3%, and preferably about 0.1 to about 2%, by weight of nonvolatile material in the coating composition. Preferred lubricants include, for example, Carnauba wax and polyethylene-type lubricants.

Another useful optional ingredient is a pigment, like titanium dioxide. A pigment, like titanium dioxide, is optionally present in the coating composition in an amount of 0 to about 50 wt-%, more typically about 5 to about 15 wt-%, based on total nonvolatiles of the coating composition.

In preferred embodiments, the coating composition is a liquid composition, in which the resins, catalyst and other optional ingredients are dispersed in a liquid carrier. Any suitable liquid carrier system may be used to prepare the coating composition. Suitable liquid carriers may include organic solvents, water, and mixtures thereof. Preferably, the carrier(s) are selected to provide a dispersion or solution of the binder polymer of the present disclosure for further formulation. In preferred embodiments, the liquid carrier is a nonaqueous carrier that preferably includes no more than a de minimus amount (e.g., 0 to 2 wt-%) of water. The liquid carrier preferably has sufficient volatility to evaporate essentially entirely from the coating composition during the curing process, such as, for example, during heating at about 220 to 260° C. for about 10 seconds to 10 minutes.

Examples of suitable organic solvents include aliphatic hydrocarbons (e.g., mineral spirits, kerosene, high flashpoint VM&P naphtha, and the like); aromatic hydrocarbons (e.g., benzene, toluene, xylene, solvent naphtha 100, 150, 200 and the like); alcohols (e.g., ethanol, n-propanol, isopropanol, n-butanol, iso-butanol, benzyl alcohol, and the like); ketones (e.g., acetone, 2-butanone, cyclohexanone, methyl aryl ketones, ethyl aryl ketones, methyl isoamyl ketones, 4-hydroxy-4-methyl-pentan-2-one, and the like); esters (e.g., ethyl acetate, butyl acetate and the like); glycols (e.g., butyl glycol); glycol ethers (e.g., ethylene glycol monomethyl ether, ethylene glycol monoethyl ether, ethylene glycol monobutyl ether, propylene glycol monomethyl ether, methoxypropanol and the like); glycol esters (e.g., butyl glycol acetate, methoxypropyl acetate and the like); and mixtures thereof. In preferred embodiments, the nonaqueous carrier does not include any of n-methyl-2-pyrrolidone or n-ethyl-2-pyrrolidone.

The amount of optional liquid carrier included in the composition is limited only by the desired, or necessary, rheological properties of the composition. Usually, a sufficient amount of liquid carrier is included in the coating composition to provide a composition that can be processed easily and that can be applied to a metal substrate easily and uniformly, and that is sufficiently removed from the coating composition during curing within the desired cure time and cure temperature. Preferred coating compositions have between 10 to 50 wt-% solids.

Preferred coating compositions of the present disclosure are substantially free, more preferably essentially free, even more preferably essentially completely free, and optimally completely free of mobile bisphenol A (BPA) and aromatic glycidyl ether compounds (e.g., diglycidyl ethers of bisphenol (BADGE), diglycidyl ethers of bisphenol F (BFDGE), and epoxy novalacs). In certain preferred embodiments, the polyester polymer and/or the coating compositions of the present disclosure are preferably substantially free, more preferably essentially free, even more preferably essentially completely free, and optimally completely free of bound BPA and aromatic glycidyl ether compounds (e.g., BADGE, BFDGE and epoxy novalacs).

In some embodiments, the binder polymer and/or the coating composition is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy moiety and a group reactive with an epoxy moiety). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. Similarly, a polyester polymer having one or more epoxy moieties that is free of epoxy backbone segments would be considered epoxy-free.

In some embodiments, the coating composition is "PVC-free." That is, the coating composition preferably contains less than 2 wt-% of vinyl chloride materials, more preferably less than 0.5 wt-% of vinyl chloride materials, and even more preferably less than 0.01 wt-% of vinyl chloride materials.

The coating composition can be applied on a metal substrate (e.g., a planar substrate) prior to, or after, forming (e.g., via stamping, drawing, draw-redraw, etc.) the metal substrate into an article. The coating composition may be applied directly to the metal substrate or to one or more primer or intermediate layers applied to the metal substrate. Typically, the coating composition of the present disclosure is applied directly to the metal substrate without the need for any primer layers (e.g., polymer primer layers). In certain preferred embodiments, the coating composition is applied directly to the metal substrate to form a single layer coating system without the need for any additional polymer layers. Nonetheless, it is contemplated that one or more primer layers, intermediate layers, and/or top layers may be used in conjunction with one or more layers of the coating composition of the present disclosure, if desired.

In preferred embodiments, the metal substrate has not been treated with hexavalent chromium.

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the present disclosure is a heat-curable coating composition.

The coating compositions of the present disclosure can be cured on the substrate using any suitable cure conditions. Thermal curing is a preferred cure mechanism. In some embodiments, the coated metal substrate is heated to a peak metal temperature ("PMT") of at least 230° C., at least 235° C., or about 240° C. or higher for a suitable period of time (e.g., about 10 seconds to about 10 minutes). Typically, the coating composition is cured at a temperature of about 250° C. or less. In one embodiment, a spray-applied coating composition of the present disclosure is cured at a PMT of about 240° C. for about 4 to about 6 minutes. In another embodiment, a roller-applied coating composition of the present disclosure is cured at a PMT of about 232 to about 260° C. for about 15 to about 30 seconds.

In preferred embodiments, the thickness of the cured coating (which may be a monolayer coating or a multilayer coating), on average, is generally from as low as about 4 microns thick to as high as about 15 to 20 microns thick.

Cured coatings of the present disclosure preferably adhere well to metal, particularly aluminum, and provide high levels of resistance to corrosion or degradation that may be caused by prolonged exposure to products such as food or beverage products, cosmetics, aerosol propellants/solvents, etc. Preferred coating compositions of the present disclosure exhibit excellent resistance to corrosion or degradation when in prolonged contact with aggressive propellants/solvents such as dimethyl ether or chloroform.

Coating compositions of the present disclosure may be useful in a variety of coating applications. As previously discussed, the coating compositions are particularly useful as adherent coatings on interior or exterior surfaces of metal packaging containers. Non-limiting examples of packaging articles include closures (including, e.g., twist-off caps for food and beverage containers); crowns; two and three-piece cans (including, e.g., food and beverage containers); shallow drawn cans; deep drawn cans (including, e.g., multi-stage draw and redraw food cans); can ends (including, e.g., easy open can ends); aerosol containers, including monobloc aerosol containers and portions thereof (e.g., metal valve bodies); and general industrial containers, cans, and can ends.

Coating compositions of the present disclosure are particularly well suited for use as an interior coating for aluminum monobloc containers (or cans) such as, for example, aluminum monobloc aerosol containers and aluminum monobloc beverage containers. Monobloc containers typically have an end portion that is seamlessly connected to a sidewall portion. A closure (e.g., in the case of a beverage container) or a valve (e.g., in the case of an aerosol container) is typically used to seal the monobloc container. As previously discussed, monobloc containers are typically formed from an aluminum slug using an extrusion process. The surface of the aluminum slug is typically coated with lubricant to facilitate the fabrication process. For certain internal monobloc container coating applications in which residual lubricant remains on the interior surface, it has been discovered by the inventors that special steps should preferably be taken to address the residual lubricant in order for the coating composition of the present disclosure to exhibit optimal coating properties (e.g., suitable corrosion resistance to aggressive propellants/solvents such as, e.g., dimethyl ether or chloroform). Such steps may include, e.g., the inclusion of an effective amount of a suitable adhesion promoter in the coating composition and/or washing the interior surface of the monobloc container, prior to coating application, using a suitable wash solution.

While not intending to be bound by any theory, it is believed that for aluminum monobloc applications, it is important that the interior surface of the monobloc container be suitably washed in order to remove, "crack," and/or otherwise affect the residual lubricant used in the container manufacturing process. In the absence of a suitable washing step, the corrosion resistance of certain embodiments of the coating composition (e.g., embodiments that do not include a suitable adhesion promoter), and especially with regards to aggressive compounds such as dimethyl ether, has been observed to be deficient, even when using certain commercially available wash solutions.

In certain embodiments, it has been observed that most commercially available wash solutions do not produce a suitably "clean" surface to yield the desired corrosion resistance unless the coating composition is specially formulated to include an effective amount of a suitable adhesion promoter. The inclusion of an effective amount of one or more suitable adhesion promoters can overcome the corrosion resistance issues that may arise from sub-optimal cleaning of the interior surface of certain aluminum monobloc containers.

An example of a suitable wash solution is an alkaline wash solution preferably including one or more strong bases (e.g., potassium hydroxide or sodium hydroxide). In some embodiments, a wash solution is used that is at least substantially free, and more preferably completely free, of silicates. ALULIQUID 25 (commercially available from Sapilub Ltd. of Switzerland), P3 ALMICO A62L (commercially available from Henkel), and BULLDOZER (commercially available from Chemsafe International, One Zenex Circle, Cleveland, OH) are presently preferred wash solutions.

Examples of suitable adhesion promoters include: hydroxyl- and/or carboxy-functional phosphate esters or carboxy-modified ester resins and mixtures thereof. In some embodiments, an adhesion promoter is used that has an acid value of about 50 mg KOH/g resin or higher or about 190 mg KOH/g resin or higher. Examples of commercially available adhesion promoters include LUBRIZOL 2063 (Lubrizol Advanced Materials, Inc.), ARADUR HT3380-1 (Huntsman), PHENODUR VPM1150 (Cytec). One or more adhesion promoters may be included in the coating composition in any amount effective to produce the desired coating properties. In some embodiments, the coating composition includes at least about 0.2 wt-%, more preferably at least 2 wt-%, and even more preferably at least 4 wt-% of adhesion promoter, based on the non-volatile weight of the coating composition. While the upper amount of adhesion promoter that may be included in the coating composition is not particularly restricted, typically, the coating composition will include less than about 40 wt-%, more typically less than about 10 wt-%, and even more typically less than about 6 wt-% of adhesion promoter, based on the non-volatile weight of the coating composition. Therefore, in presently preferred embodiments, the coating composition of the present disclosure is applied to a suitably clean metal surface in which any residual lubricant has been suitably "washed." The coating composition may be applied using any application method. The coating composition of the present disclosure can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating.

In certain preferred embodiments, the coating composition of the present disclosure is a spray-applied liquid coating preferably having a viscosity of from 25 to 200 seconds, more preferably from about 50 to 110 seconds, when measured using a DIN 4 cup at 23° C. In order for a spray-applied coating composition to exhibit optimal spray properties, the liquid carrier should preferably include solvent(s) having suitable boiling points such that the liquid carrier: (i) does not unsuitably evaporate in the time period between which the coating composition exits the spray nozzle and contacts the surface of the metal substrate and (ii) efficiently evaporates during coating cure to avoid cure problems or unsuitably long bake times. Preferred organic solvents for spray application have a boiling point from about 100° C. to 200° C., more preferably 110° C. to 190° C. To avoid potential run problems in the coating and/or minimize bake times, the spray applied coating preferably has a total solids content of at least 20 wt-%.

The coating compositions of the present disclosure may also be used to coat metal surface of valves (or valve closures) for aerosol cans. For example, the coating composition may be applied to flat aluminum plate or coil that has been suitably cleaned and cured. The coated aluminum substrate is then fabricated to form the desired three-dimensional article.

The global extraction test is designed to estimate the total amount of mobile material that can potentially migrate out of a coating and into food or other product for human contact or consumption packed in a coated can. Typically coated substrate is subjected to water or solvent blends under a variety of conditions to simulate a given end-use. Acceptable extraction conditions and media can be found in 21 CFR section 175.300, paragraphs (d) and (e). The current allowable global extraction limit as defined by the FDA regulation is 50 parts per million (ppm). Preferred coatings of the present disclosure give global extraction results of less than 50 ppm, more preferably less than 10 ppm, even more preferably less than 1 ppm, and even more preferably below non-detect.

Test Methods

Unless indicated otherwise, the following test methods were utilized in the Examples that follow.

A. Solvent Resistance Test

The extent of "cure" or crosslinking of a coating is measured as a resistance to solvents, such as acetone. This test is performed as described in ASTM D 5402-93. The number of double-rubs (i.e., one back-and-forth motion) is reported. Testing is stopped if no coating failure has been observed after 100 double-rubs.

B. Adhesion Test

Adhesion testing is performed to assess whether the coating adheres to the coated substrate. The adhesion test was performed according DIN 53151 (Deutsches Institut für Normung e.V. 10772 Berlin, Germany) using SCOTCH 610 tape, available from 3M Company of Saint Paul, Minnesota. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

In the data reported in the below Examples, the adhesion test was performed after (i) in the case of cans, dipping the cans into boiling water and holding the temperature in an 80° C. water bath for 30 minutes; or (ii) in the case of coated panels, soaking the coated panels for 30 minutes in an 80° C. water bath.

C. Porosity Test

This test provides an indication of the level of flexibility of a coating. Moreover, this tests measures the ability of a coating to retain its integrity as it undergoes the formation process necessary to produce a food or beverage can end. In particular, it is a measure of the presence or absence of cracks or fractures in the formed end. To be suitable for food or beverage can end applications, a coating composition should preferably exhibit sufficient flexibility to accommodate the extreme contour of the rivet portion of the easy open food or beverage can end.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 206 standard opening can ends were exposed for a period of 4 seconds to an electrolyte solution comprised of 1% NaCl by weight in deionized water. Metal exposures were measured using a WACO Enamel Rater II (available from the Wilkens-Anderson Company, Chicago, IL) with an output voltage of 6.3 volts. The measured electrical current, in milliamps, is reported. End continuities are typically tested initially and then after the ends are subjected to pasteurization or retort.

A coating is considered herein to satisfy the Porosity Test if it passes an electric current (after end formation) of less than about 10 milliamps (mA) when tested as described above.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Coating Composition

A solvent-based coating composition was prepared from the ingredients of Table 1 and a combination of organic solvents including xylene and DOWANOL PM solvent. The coating composition was prepared at room temperature using suitable mixing to yield a homogenous solution. The resulting coating composition had a viscosity as measured using a DIN 4 cup at 23° C. of 50 to 110 seconds, a density of 1.05-1.15 g/ml, and a nonvolatile content (0.2 gram sample heated for 1 hour at 180° C.) of 42 to 46%.

TABLE 1

| Ingredient | % of total solids of coating composition |
|---|---|
| Hydroxyl-functional, THEIC-containing polyester resin (solvated in benzyl alcohol and having a high hydroxyl number) | 90 |
| Titanium-containing organometallic catalyst | 4.9 |
| Wetting Additive | 0.2 |
| Slip Additive | 0.4 |
| Adhesion promoter | 4.5 |

The coating composition of Example 1 was applied onto aluminum panels using a bar coater and cured for 6 minutes in a 240° C. oven to yield a cured coating having a dry film weight of 7.5 grams per square meter. The coated panels were tested for various properties and exhibited the properties reported in the below Table 2.

TABLE 2

| Wedge Bend | ≥65% |
|---|---|
| Solvent Resistance Test (Acetone) | ≥100 double-rubs |
| Porosity Test (1% NaCl) | ≤3 mA |
| Adhesion Test (after 30 minute immersion in 95-100° C. hot water bath) | 10, (10 = perfect) |
| Feathering adhesion test (after 30 minute immersion in 95-100° C. hot water bath) | 10, (10 = perfect) |

Example 2

Monobloc Can

An uncoated aluminum monobloc aerosol can was first washed for 4 minutes with a 70° C. ALULIQUID 25 wash solution (silicate-free wash solution available from Sapilub, Ltd. of Switzerland) using a standard concentration of 10 grams of ALULIQUID 25 concentrate per liter of deionized water and then rinsed with tap water and afterwards with 55° C. deionized water. The dried and washed can was then spray coated (using commercially available spray equipment from Sprimag of Germany with a tank pressure of 1.5-2 bar (1.5-2 kg/cm$^2$) and an air pressure of about 3-5 bar (3-5 kg/cm$^2$)) on its cleaned interior surface with the coating composition of Example 1 and cured for 6 minutes in a 240° C. oven to yield a cured film having an average coating thickness of 10 microns.

Various tests were conducted on the coated aluminum monobloc aerosol container to assess the coating properties. The coated aluminum monobloc aerosol cans of Example 2 exhibited coating properties that were equivalent to, or better than, that of control aluminum monobloc aerosol cans (prepared in the same manner as Example 2) which were coated on the interior surface with a similar thickness coating of either a conventional epoxy-phenolic lacquer or a polyamidimid lacquer.

To assess the ability of the interior coating of Example 2 to resist an aggressive propellant commonly used in aerosol cans (i.e., dimethyl ether), the monobloc cans of Example 2 and the control cans were each filled with a mixture comprising, by volume, ⅓ dimethyl ether, ⅓ water, and ⅓ ethanol. The cans were stored for 1 week at 55° C. and then an additional 4 weeks at 40° C. The filled cans were checked after 1 week and 5 weeks for various coating properties. The results are provided in the below Table 3.

TABLE 3

| Aluminum Monobloc Container Tested | 1 week at 55° C. | | | | 1 week at 55° C. + 4 weeks at 40° C. | | | |
|---|---|---|---|---|---|---|---|---|
| | coloration | corrosion | blisters | adhesion | coloration | corrosion | blisters | adhesion |
| Epoxy-phenolic control can | 10 | 10 | 5 | 4 | 10 | 9 | 3 | 3 |
| Polyamidimid control can | 10 | 10 | 10 | 10 | 10 | 10 | 10 | 10 |
| Example 2 can | 10 | 10 | 10 | 10 | 10 | 10 | 10 | 10 |

Rating
10: perfect
6: borderline
0: very poor

In the above Table 3, a value of "10" indicates a perfect result in the performed test (i.e., no coloration, no corrosion, no blisters, no adhesion loss). As shown in Table 2, the aluminum monobloc can of Example 2 scored a "10" in every test, which was equal to the polyamidimid control and superior in most respects to the epoxy-phenolic control.

Pure chloroform is a strong solvent that can also be used to assess the solvent resistance of cured lacquers. Fresh control cans and the Example 2 cans were filled with pure chloroform. The lacquer of the epoxy phenolic control cans exhibited unsuitable softening after 12 to 24 hours, whereas the lacquers of the polyamidimid control can and the Example 2 can did not exhibit unsuitable softening after 3 days.

Thus, as evidenced by the aforementioned data, the coating composition of Example 1 exhibited an excellent balance of coating properties when used as an interior coating of an aluminum monobloc aerosol can. As evidenced by both the chloroform and the DME tests, the coating composition of Example 1 is suitable in such end uses even when the packaged product includes chemically aggressive compounds. Long-term pack tests (e.g., 1 to 6 months stored at 40° C.) were also performed using various packaged products (e.g., commercially available hairspray, hair mousse, and deodorants) and the coating composition of Example 1 likewise exhibited superior performance properties.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. An article, comprising:
   an aluminum monobloc container or a portion thereof; and
   a coating formed from a spray-applied coating composition that does not include n-methyl-2-pyrrolidone (NMP), comprises an adhesion promoter and is substantially free of bisphenol A, the coating disposed on at least a portion of an interior surface of the aluminum monobloc container or a portion thereof, wherein the coating composition includes at least 15 weight percent of a polyester polymer that includes one or more heterocyclic groups having a ring that includes one or more nitrogen atoms and one or more carbon atoms of carbonyl groups, based on the total nonvolatile weight of the coating composition;
   wherein the coating exhibits no corrosion or adhesion loss after storage for one week at 55° C. while contacting a mixture comprising, by volume, ⅓ dimethyl ether, ⅓ water, and ⅓ ethanol.

2. The article of claim 1, wherein the coating composition further comprises at least 0.5 weight percent of titanium-containing catalyst, based on the total non-volatile weight of the coating composition.

3. The article of claim 2, wherein the titanium-containing catalyst comprises a titanium-containing organometallic catalyst, and wherein the coating composition includes at least 4 weight percent of titanium-containing organometallic catalyst, based on the total non-volatile weight of the coating composition.

4. The article of claim 2, wherein the coating composition includes at least 2 weight percent of titanium-containing organometallic catalyst, based on the total non-volatile weight of the coating composition, and wherein the titanium-containing catalyst comprises a tetraalkyltitanate.

5. The article of claim 1, wherein the adhesion promoter comprises an acid-functional adhesion promoter.

6. The article of claim 5, wherein the coating composition comprises at least 2 weight percent of the acid-functional adhesion promoter, based on the total non-volatile weight of the coating composition.

7. The article of claim 1, wherein the adhesion promoter has an acid value of about 50 mg KOH/g resin or higher.

8. The article of claim 1, wherein the adhesion promoter comprises a hydroxyl-and/or carboxyl-functional phosphate ester, a carboxy-modified ester resin, or a mixture thereof.

9. The article of claim 1, wherein the coating composition exhibits no corrosion or adhesion loss after storage at 40° C. for an additional four weeks while contacting the mixture comprising, by volume, ⅓ dimethyl ether, ⅓ water, and ⅓ ethanol; and wherein the polyester polymer is formed from ingredients including tris (2-hydroxyethyl) isocyanurate or a derivative thereof.

10. The article of claim 1, wherein the polyester polymer is hydroxyl-functional, and wherein the coating composition includes an amino crosslinker, a phenolic crosslinker, a blocked isocyanate crosslinker, or a combination thereof.

11. The article of claim 10, wherein the polyester polymer is formed from ingredients including tris (2-hydroxyethyl) isocyanurate or a derivative thereof, and wherein the polyester polymer comprises a polyester-imide polymer.

12. The article of claim 1, wherein the aluminum monobloc container contains a pressurized packaged product including dimethyl ether.

13. An article, comprising:
   an aluminum monobloc pressurized container or a portion thereof formed from an aluminum slug via an impact extrusion process that uses a lubricant to facilitate the fabrication process; and
   a thermoset coating having a thickness of, an average, from as low as about 4 microns thick to as high as about 20 microns thick; wherein the coating is formed from a spray-applied coating composition disposed on at least a portion of an interior surface of the aluminum monobloc container or a portion thereof; and wherein the coating composition does not include n-methyl-2-pyrrolidone (NMP), is substantially free of bisphenol A, comprises an adhesion promoter and includes at least about 50 weight percent of a hydroxy-functional polyester-imide polymer that includes one or more heterocyclic groups having a ring that includes one or more nitrogen atoms and one or more carbon atoms of carbonyl groups, based on the total nonvolatile weight of the coating composition, and wherein the polyester polymer comprises a reaction product of ingredients including tris (2-hydroxyethyl) isocyanurate; and wherein the pressurized container further includes a packaged product including dimethyl ether; and wherein the coating exhibits no corrosion or adhesion loss, while contacting the packaging product, after storage for one week at 55° C. and then 40° C. for an additional four weeks.

14. The article of claim 13, wherein the coating composition includes xylenes.

15. The article of claim 13, wherein the coating composition is substantially epoxy-free.

16. The article of claim 13, wherein the adhesion promoter comprises an acid-functional adhesion promoter.

17. The article of claim 16, wherein the hydroxy-functional polyester-imide polymer has an acid number of less than about 10.

18. The article of claim 17, wherein the hydroxy-functional polyester-imide polymer is hydroxyl-terminated.

19. An inside spray coating composition that does not include n-methyl-2-pyrrolidone (NMP) and is substantially free of bisphenol A, the coating composition having a viscosity of from 25 to 200 seconds, when measured using a DIN cup at 23° C. and comprising:

at least 50 weight percent, based on the total non-volatile weight of the coating composition, of a hydroxyl-functional polyester polymer having an acid number of less than about 10 and formed from ingredients including tris (2-hydroxyethyl) isocyanurate or a derivative thereof;

at least 0.5 weight percent of titanium-containing organometallic catalyst, based on the total non-volatile weight of the coating composition;

at least 0.2 weight percent of an adhesion promoter, based on the total non- volatile weight of the coating composition;

an amino crosslinker, a phenolic crosslinker, a blocked isocyanate crosslinker, or a combination thereof; and an organic solvent having a boiling point of 110° C. to 190° C.;

wherein the coating composition is suitable for use in forming a spray-applied thermoset coating on an interior of an aluminum monobloc container or a portion thereof formed from an aluminum slug using an impact extrusion process that uses a lubricant to facilitate the fabrication process.

* * * * *